United States Patent
Zhang

(10) Patent No.: US 6,605,683 B1
(45) Date of Patent: Aug. 12, 2003

(54) PROCESS FOR PRODUCING A SILICONE OLIGOMER SOLUTION AND ORGANOPOLYSILOXANE FILM FORMED FROM THE SOLUTION

(75) Inventor: Zuyi Zhang, Hyogo (JP)

(73) Assignee: Nihon Yamamura Glass Co., LTD, Hyogo (JP)

( * ) Notice: Subject to any disclaimer, the term of this patent is extended or adjusted under 35 U.S.C. 154(b) by 0 days.

(21) Appl. No.: 09/890,874

(22) PCT Filed: Jun. 18, 1999

(86) PCT No.: PCT/JP99/03285

§ 371 (c)(1),
(2), (4) Date: Aug. 7, 2001

(87) PCT Pub. No.: WO00/78769

PCT Pub. Date: Dec. 28, 2000

(51) Int. Cl.$^7$ .............................................. C08G 77/08
(52) U.S. Cl. .......................... 528/14; 528/20; 528/33; 528/34; 525/474; 525/477; 556/450; 556/459; 556/463; 556/465; 556/466; 556/467; 428/447
(58) Field of Search .............................. 528/14, 20, 33, 528/34; 525/474, 477; 556/450, 459, 463, 465, 466, 467; 428/447

(56) References Cited

U.S. PATENT DOCUMENTS

| | | | | |
|---|---|---|---|---|
| 4,511,728 A | * | 4/1985 | Kreuzer et al. | 556/419 |
| 6,001,948 A | * | 12/1999 | Scheim et al. | 528/34 |
| 6,258,969 B1 | * | 7/2001 | Sawai et al. | 556/457 |
| 6,291,697 B1 | * | 9/2001 | Tanaka et al. | 556/457 |

FOREIGN PATENT DOCUMENTS

| | | |
|---|---|---|
| JP | 62-289279 | 12/1987 |
| JP | 63-117074 | 5/1988 |
| JP | 63-137972 | 6/1988 |
| JP | 63-168470 | 7/1988 |
| JP | 8-003176 | 1/1996 |
| JP | 8-165114 | 6/1996 |
| JP | 9-227683 | 9/1997 |
| JP | 10-251269 | 9/1998 |
| JP | 10-251516 | 9/1998 |
| JP | 10-298289 | 11/1998 |

OTHER PUBLICATIONS

Abstract of JP 10–251,256, Matsumura et al. Sep. 1998.

* cited by examiner

Primary Examiner—Robert Dawson
Assistant Examiner—Jeffrey B. Robertson
(74) Attorney, Agent, or Firm—Young & Thompson

(57) ABSTRACT

A process for producing a solution of a silicone oligomer which comprises adding to an alkoxysilane, as a self-catalyst, a solution comprising a silicon compound which is soluble in hydrophilic solvents and has an average structural unit represented by $R^1{}_n SiO_{x/2}(OH)_y(OR^2)_z$, wherein $R^1$ represents an alkyl group having 1 to 3 carbon atoms, vinyl group or phenyl group, a plurality of $R^1$ may represent a same group or different groups, $R^2$ represents an alkyl group having 1 to 3 carbon atoms, a plurality of $R^2$ may represent a same group or different groups and n, x, y and z represent numbers satisfying relations: $0 \leq n < 3$, $0 < x < 4$, $y > 0$, $z \geq 0$ and $y+z=4-n-x$, and hydrolyzing and polycondensing the alkoxysilane; and a film of an organopolysiloxane formed from the solution of a silicone oligomer. In accordance with the process, a solution of a silicone oligomer which exhibits excellent storage stability in high concentrations and contains small or no amounts of acid or base components is produced by hydrolyzing and polycondensing an alkoxysilane and the film of an organopolysiloxane formed from the above solution has excellent physical properties.

13 Claims, No Drawings

PROCESS FOR PRODUCING A SILICONE OLIGOMER SOLUTION AND ORGANOPOLYSILOXANE FILM FORMED FROM THE SOLUTION

TECHNICAL FIELD

The present invention relates to a process for producing a solution of a silicone oligomer and a film of an organopolysiloxane formed from the solution. More particularly, the present invention relates to a process for producing a solution of a silicone oligomer which exhibits excellent storage stability in high concentrations and contains small or no amounts of acid or base components by hydrolyzing and polycondensing an alkoxysilane in the presence of a self-catalyst and a film of an organopolysiloxane which is formed from the above solution and has excellent physical properties.

BACKGROUND ART

Bulk materials, coating films and self-sustained films having excellent chemical durability such as weatherability, resistance against water and other chemicals and excellent mechanical properties such as hardness etc. are necessary, and preparation of silicone oligomers from organoalkoxysilanes has been actively studied for those purposes. However, since organoalkoxysilanes are insoluble in water which must be used in hydrolysis, organoalkoxysilanes are dissolved in hydrophilic organic solvents such as alcohols etc. to prepare a homogeneous solution and hydrolysis is conducted using the prepared homogeneous solution (The Science of the Sol-Gel Process, by SUMIO SAKKA, published by AGUNE SHOHU Co., Ltd.). It is also proposed that water be added slowly so that a rapid reaction does not take place.

To improve mechanical properties of films of organopolysiloxanes, various processes for forming a composite with silica sol or alumina sol have been proposed. For example, in Japanese Patent Application Laid-Open No. Showa 63(1988)-117074, a coating composition containing a polycondensate of organotrialkoxysilane, colloidal silica, water and a hydrophilic organic solvent is proposed as a coating composition for forming a film having a high hardness and other excellent physical properties on the surface of metals, ceramics and glasses. In Japanese Patent Application Laid-Open No. Showa 63(1988)-137972, a coating composition containing a polycondensate of organotrialkoxysilane, colloidal silica, water, a hydrophilic organic solvent and a heterocyclic compound having 2 or 3 nitrogen atoms or an aluminum alkoxide is proposed. In Japanese Patent Application Laid-Open No. Showa 63(1988)-168470, a coating composition containing a polycondensate of organotrialkoxysilane, colloidal silica, water, a hydrophilic organic solvent and a surfactant having fluorine is proposed. However, these coating compositions have small solid contents.

In Japanese Patent Application Laid-Open No. Showa 62(1987)-289279, as a process for forming a transparent coating film having excellent hardness, heat resistance, resistance against water and corrosion resistance on the surface of metals, cements, glasses, ceramics, plastics, papers and fibers, a method comprising coating a substrate with a composition containing (a) a product of hydrolysis or partial condensation of organotrialkoxysilane, (b) colloidal silica dispersed in a lower aliphatic alcohol and (c) ethylene glycol or a derivative thereof and heating the coated substrate is proposed. However, also in this method, the composition has a small solid content.

As the catalyst for preparing silicone oligomers, in general, an inorganic acid or an organic acid is used. In Japanese Patent Application Laid-Open No. Heisei 8(1996)-165114, the present inventors proposed a process comprising reacting a methyltrialkoxysilane with water in the presence of a metal chelate compound which is soluble in the methyltrialkoxysilane and aging the obtained reaction product to form a gel as the process for easily producing a transparent bulk material of silica gel which has excellent mechanical properties, chemical durability and heat stability and is useful for the host material being doped with an optically functional organic compounds. In this process, it is preferable that pH immediately after preparation of the reaction solution is adjusted to 1 to 7. However, when the product is used as a coating fluid in a condition such that a great amount of an acid is left remaining in the solution, there is the possibility that, in the case of some types of the substrate, the substrate reacts with the acid and a problem arises with respect to the adhesive strength at the interface of the coating film and the substrate. Moreover, a solution of a high concentration tends to gel, since the acid in the coating fluid gradually promotes the reaction. To overcome these problems, it is necessary that a great amount of an organic solvent be used to suppress the formation of a gel. In Japanese Patent Application Laid-Open No. Heisei 10(1998)-298289, as the process for producing with stability a siloxane polymer having an intermediate degree of condensation which is advantageously used for producing sheets, bulk materials and coating materials having heat resistance, an electrically insulating property and excellent transparency, a process comprising hydrolyzing and condensing alkoxysilane in the presence of an acid catalyst and then removing the acid catalyst with an anion exchange resin containing no water is proposed. However, this process has a problem in that the process is complicated.

Therefore, a process for producing a silicone oligomer efficiently without adding an inorganic acid or an organic acid and producing a coating fluid exhibiting excellent storage stability has been desired.

The present invention has an object to provide a process for producing a solution of a silicone oligomer which exhibits excellent storage stability in high concentrations and contains small or no amounts of acid or base components by hydrolyzing and polycondensing an alkoxysilane and a film of an organopolysiloxane which is formed from the above solution and has excellent physical properties.

DISCLOSURE OF THE INVENTION

As the result of extensive studies by the present inventors to achieve the above object, it was found that a solution comprising a silicone oligomer which exhibited excellent storage stability in high concentrations could be obtained by adding to an alkoxysilane, as the self-catalyst, a solution comprising a silicon compound soluble in hydrophilic organic solvents which was obtained by hydrolyzing and polycondensing an alkoxysilane and hydrolyzing and polycondensing the alkoxysilane. The present invention has been completed based on this knowledge.

The present invention provides:

(1) A process for producing a solution of a silicone oligomer which comprises:
  adding to an alkoxysilane, as a self-catalyst, a solution comprising a silicon compound which is soluble in hydrophilic organic solvents and has an average structural unit represented by $R^1{}_n SiO_{x/2}(OH)_y(OR^2)_z$, wherein $R^1$ represents an alkyl group having 1 to 3 carbon atoms, vinyl group or phenyl group, a plurality of $R^1$ may represent a same group or different groups, $R^2$ represents an alkyl group having 1 to 3 carbon atoms, a plurality of $R^2$ may represent a same group or different groups and n, x, y and z represent numbers satisfying relations: $0 \leq n < 3$, $0 < x < 4$, $y > 0$, $z \geq 0$ and $y+z=4-n-x$, and hydrolyzing and polycondensing the alkoxysilane;

(2) A process for producing a solution of a silicone oligomer described in (1), wherein a metal chelate compound is added as a catalyst;

(3) A process for producing a solution of a silicone oligomer described in (1), wherein the silicone oligomer comprised in the solution of a silicone oligomer has an average structural unit represented by $R^3{}_a SiO_{b/2}(OH)_c(OR^4)_d$, wherein $R^3$ represents an alkyl group having 1 to 3 carbon atoms, vinyl group or phenyl group, a plurality of $R^3$ may represent a same group or different groups, $R^4$ represents an alkyl group having 1 to 3 carbon atoms, a plurality of $R^4$ may represent a same group or different groups and a, b, c and d represent numbers satisfying relations: $0.8 \leq a \leq 1.7$, $2 < b < 3.2$, $c > 0$, $d > 0$ and $c+d=4-a-b$;

(4) A process for producing a solution of a silicone oligomer described in (1), wherein the self-catalyst is prepared by hydrolyzing and polycondensing an alkoxysilane in a presence of at least one compound selected from the group consisting of acids and metal chelate compounds as a catalyst;

(5) A process for producing a solution of a silicone oligomer described in (1), wherein the self-catalyst is prepared by hydrolyzing and polycondensing an alkoxysilane in a presence of, as a catalyst, a solution comprising a silicon compound which is soluble in hydrophilic solvents and has an average structural unit represented by $R^1{}_n SiO_{x/2}(OH)_y(OR^2)_z$, wherein $R^1$ represents an alkyl group having 1 to 3 carbon atoms, vinyl group or phenyl group, a plurality of $R^1$ may represent a same group or different groups, $R^2$ represents an alkyl group having 1 to 3 carbon atoms, a plurality of $R^2$ may represent a same group or different groups and n, x, y and z represent numbers satisfying relations: $0 \leq n < 3$, $0 < x < 4$, $y > 0$, $z \geq 0$ and $y+z=4-n-x$;

(6) A process for producing a solution of a silicone oligomer described in (5), wherein a metal chelate compound is added as a catalyst;

(7) A process for producing a solution of a silicone oligomer described in any of (2), (4) and (6), wherein a ligand of the metal chelate compound is at least one compound selected from the group consisting of β-diketones and cyclic polyethers having a large ring; and (8) A film of an organopolysiloxane formed from a solution of a silicone oligomer which is produced in accordance with a process described in (1).

THE MOST PREFERRED EMBODIMENT TO CARRY OUT THE INVENTION

The process for producing a solution of a silicone oligomer of the present invention comprises adding to an alkoxysilane, as a self-catalyst, a solution comprising a silicon compound which is soluble in hydrophilic organic solvents and has an average structural unit represented by $R^1{}_n SiO_{x/2}(OH)_y(OR^2)_z$ and hydrolyzing and polycondensing the alkoxysilane. In the above formula, $R^1$ represents an alkyl group having 1 to 3 carbon atoms, vinyl group or phenyl group, a plurality of $R^1$ may represent the same group or different groups, $R^2$ represents an alkyl group having 1 to 3 carbon atoms, a plurality of $R^2$ may represent the same group or different groups and n, x, y and z represent numbers satisfying relations: $0 \leq n < 3$ and preferably $0.8 \leq n \leq 2$, $0 < x < 4$ and preferably $1 < x < 3$, $y > 0$, $z \geq 0$ and $y+z=4-n-x$. The average structural unit means a structural unit of a silicon compound averaged and expressed based on one Si atom.

When n is greater than or equal to 3, the silicon compound in the self-catalyst tends to vaporize and, moreover, there is the possibility that the silicon compound is condensed and deactivated. Since $y > 0$, namely the silanol group is present, the alkoxysilane is protonated by the proton in the silanol and the hydrolysis with water proceeds. As a result, the polycondensation is promoted. This type of the catalyst is defined as the self-catalyst because the silicone oligomer in the obtained solution of a silicone oligomer can also become the silicon compound having the average structural unit represented by $R^1{}_n SiO_{x/2}(OH)_y(OR^2)_z$. The solution of a silicone oligomer obtained in accordance with the process of the present invention can be used without further treatments as the self-catalyst which is added to the alkoxysilane. It is preferable that the amount of the self-catalyst added to the alkoxysilane is 0.1 to 50% by weight relative to the alkoxysilane. When the amount of the self-catalyst is less than 0.1% by weight relative to the alkoxysilane, the amount of transfer of proton is small and therefore there is the possibility that the efficiency of hydrolysis decreases. When the amount of the self-catalyst exceeds 50% by weight relative to the alkoxysilane, the amount of the silicone oligomer derived from the self-catalyst in the obtained solution of a silicone oligomer increases. This causes a decrease in the productivity of the silicone oligomer and, moreover, there is the possibility that it becomes difficult to control the quality of the obtained solution of a silicone oligomer. It is more preferable that the amount of the self-catalyst added to the alkoxysilane is 1 to 40% by weight relative to the alkoxysilane.

In the present invention, the alkoxysilane to which the self-catalyst is added is not particularly limited. Examples of the alkoxysilane include tetraalkoxysilanes such as tetramethoxysilane (TMOS) and tetraethoxysilane (TEOS); trialkoxysilanes such as methyltrimethoxysilane (MTMS), methyltriethoxysilane (MTES), ethyltrimethoxysilane (ETMS), phenyltriethoxysilane (PhTES), vinyltriethoxysilane (VTES), n-propyltrimethoxysilane (n-PrTMS) and isopropyltrimethoxysilane (iso-PrTMS); dialkoxysilanes such as dimethyldiethoxysilane (DMDE), diphenyldimethoxysilane (DPhDM) and methylethyldimethoxysilane (MEDM); and monoalkoxysilanes such as trimethylmethoxysilane (TMMS). These alkoxysilanes may be suitably mixed in a manner such that the silicone oligomer in the solution of a silicone oligomer has the average structural unit represented by $R^3{}_a SiO_{b/2}(OH)_c(OR^4)_d$, wherein $R^3$ represents an alkyl group having 1 to 3 carbon atoms, vinyl group or phenyl group, a plurality of $R^3$ may represent the same group or different groups, $R^4$ represents an alkyl group having 1 to 3 carbon atoms, a plurality of $R^4$ may represent the same group or different groups and a, b, c and d represent numbers satisfying relations: $0.8 \leq a \leq 1.7$, $2 < b < 3.2$, $c > 0$, $d > 0$ and $c+d=4-a-b$.

In the process of the present invention, it is preferable that a metal chelate compound is added as a catalyst in addition to the above self-catalyst. The metal chelate compound not only works as the hydrolysis catalyst, but also exhibits the function of promoting deprotonation of the silanol and making the polycondensation reaction proceed more linearly. When a great amount of a methyltrialkoxysilane is used as the raw material, the metal chelate compound suppresses crystalline precipitates. Moreover, when the metal chelate compound is used as the catalyst, the obtained solution of a silicone oligomer has a long gelation time and can be stored for a long time. This property is advantageous for forming a coating film. The metal chelate compound used above is not particularly limited. Preferable examples include metal chelate compounds containing a β-diketone having the 1,3-dioxopropylene chain or a cyclic polyether having a large ring as the ligand.

The type of the metal in the metal chelate compound is not particularly limited. Metals having great constants of complex formation with ligands are preferably used. Examples of such metal chelate compounds include metal chelate compounds of β-diketones such as tris(acetylacetonato) aluminum(III), tris(ethyl acetoacetato)aluminum(III), tris (diethyl malonato)aluminum(III), bis(acetylacetonato) copper(II), tetrakis(acetylacetonato)zirconium(IV), tris (acetylacetonato)chromium(III), tris(acetylacetonato)cobalt (III) and titanium(II) oxyacetylacetonate $[(CH_3COCHCOCH_3)_2TiO]$; metal chelate compounds of β-diketones with rare earth metals; and metal chelate compounds of cyclic polyethers having a large ring such as 18-crown-6-potassium chelate compound salts, 12-crown-4-lithium chelate compound salts and 15-crown-5-sodium chelate compound salts.

In the process of the present invention, the amount of the metal chelate compound which is added in combination with the self-catalyst is not particularly limited and can be suitably selected in accordance with the exhibited catalytic effect. In general, it is preferable that the amount is 0.001 to 5% by mole and more preferably 0.005 to 1% by mole relative to the alkoxysilane. The amount of the metal chelate compound described above include the amount of the metal chelate compound contained in the self-catalyst. When the amount of the catalyst of the metal chelate compound is less than 0.001% by mole relative to the alkoxysilane, there is the possibility that the catalytic effect on the hydrolysis and the polycondensation does not occur sufficiently. When the amount of the metal chelate compound exceeds 5% by mole relative to the alkoxysilane, there is the possibility that the metal chelate compound is precipitated during the formation of a film, adversely affecting the properties of the film of the organopolysiloxane.

It is preferable that the silicone oligomer in the solution of a silicone oligomer obtained in accordance with the process of the present invention has an average structural unit represented by $R^3_a SiO_{b/2}(OH)_c(OR^4)_d$. In the formula, $R^3$ represents an alkyl group having 1 to 3 carbon atoms, vinyl group or phenyl group, a plurality of $R^3$ may represent the same group or different groups, $R^4$ represents an alkyl group having 1 to 3 carbon atoms, a plurality of $R^4$ may represent the same group or different groups and a, b, c and d represent numbers satisfying relations: $0.8 \leq a \leq 1.7$ and preferably $1 \leq a \leq 1.3$, $2 < b < 3.2$ and preferably $2 < b < 3$, $c > 0$, $d > 0$ and $c + d = 4 - a - b$. The average structural unit means a structural unit of a silicon compound averaged and expressed based on one Si atom.

When a is smaller than 0.8, there is the possibility that stress relaxation in the coating film or the self-sustained film during the drying step is suppressed and cracks are formed in the film. When a exceeds 1.7, there is the possibility that formation of a three-dimensional network is suppressed and physical properties of the coating film or the self-sustained film deteriorate. When b is smaller than or equal to 2, there is the possibility that formation of linear oligomers is suppressed and the amount of volatile components increases. When b exceeds or is equal to 3.2, there is the possibility that stress relaxation of the coating film or the self-sustained film during the drying step is suppressed and cracks are formed in the film. When a film of an organopolysiloxane is formed, it is preferable that a curing agent is added to the solution of a silicone oligomer. Hydroxyl group OH in the silicon oligomer acts as the crosslinking point, when the network is formed by the working of the curing compound. The alkoxyl group $OR^4$ improves the storage stability of the solution before addition of the curing compound.

In the process of the present invention, the molecular weight of the silicone oligomer is not particularly limited. The molecular weight of the silicone oligomer may be great as long as the silicone oligomer formed by hydrolysis and polycondensation of the alkoxysilane is dissolved into alcohols formed during the formation of the silicone oligomer and alcohols derived from the self-catalyst, and a homogeneous solution can be formed.

In the process of the present invention, when the self-catalyst is prepared from the alkoxysilane, it is preferable that at least one compound selected from the group consisting of acids and metal chelate compounds is added to the alkoxysilane as the catalyst. Examples of the acid include acids which are used in the ordinary sol-gel reactions, i.e., inorganic acids such as nitric acid and hydrochloric acid and organic acids such as acetic acid. When a coating film is formed on the surface of a substrate such as a metal substrate, it is preferable that a catalyst of a metal chelate compound is used so that corrosion at the interface can be suppressed. When the self-catalyst is added in a great amount in the preparation of the solution of a silicone oligomer, it is preferable that a catalyst of a metal chelate compound is used for preparation of the self-catalyst since there is the possibility that storage stability of the solution of silicone oligomer deteriorates when an acid catalyst is used.

A self-catalyst can be newly prepared by hydrolyzing and polycondensing the alkoxysilane using the self-catalyst obtained above as the catalyst. In this case, it is preferable that a metal chelate compound is used in combination as the catalyst.

In the process of the present invention, the alkoxysilane used for preparing the self-catalyst is not particularly limited. Examples of the alkoxysilane include tetraalkoxysilanes such as tetramethoxysilane (TMOS) and tetraethoxysilane (TEOS); trialkoxysilanes such as methyltrimethoxysilane (MTMS), methyltriethoxysilane (MTES), ethyltrimethoxysilane (ETMS), phenyltriethoxysilane (PhTES), vinyltriethoxysilane (VTES), n-propyltrimethoxysilane (n-PrTMS) and isopropyltrimethoxysilane (iso-PrTMS); dialkoxysilanes such as dimethyldiethoxysilane (DMDE), diphenyldimethoxysilane (DPhDM) and methylethyldimethoxysilane (MEDM); and monoalkoxysilanes such as trimethylmethoxysilane (TMMS). These alkoxysilanes may be suitably mixed in a manner such that the silicon compound, which is soluble in hydrophilic organic solvents in the self-catalyst, has the average structural unit represented by $R^1_n SiO_{x/2}(OH)_y(OR^2)_z$, wherein $R^1$ represents an alkyl group having 1 to 3 carbon atoms, vinyl group or phenyl group, a plurality of $R^1$ may represent the same group or different groups, $R^2$ represents an alkyl group having 1 to 3 carbon atoms, a plurality of $R^2$ may represent the same group or different groups and n, x, y and z represent numbers satisfying relations: $0 \leq n < 3$, $0 < x < 4$, $y > 0$, $z \geq 0$ and $y + z = 4 - n - x$.

The metal chelate compound used for preparation of the self-catalyst used in the process of the present invention is not particularly limited. Metal chelate compounds containing a β-diketone having the 1,3-dioxopropylene chain or a cyclic polyether having a large ring as the ligand can be preferably used. The type of the metal in the metal chelate compound is not particularly limited. Metals having great constants of complex formation with ligands are preferably used. Examples of such metal chelate compounds include metal chelate compounds of β-diketones such as tris (acetylacetonato)aluminum(III), tris(ethyl acetoacetato) aluminum(III), tris(diethyl malonato)aluminum(III), bis (acetylacetonato)copper(II), tetrakis(acetylacetonato) zirconium(IV), tris(acetylacetonato)chromium(III), tris (acetylacetonato)cobalt(III) and titanium(II) oxyacetylacetonate [$(CH_3COCHCOCH_3)_2TiO$]; metal chelate compounds of β-diketones with rare earth metals; and metal chelate compounds of cyclic polyethers having a large ring such as 18-crown-6-potassium chelate compound salts, 12-crown-4-lithium chelate compound salts and 15-crown-5-sodium chelate compound salts.

When the self-catalyst used in the process of the present invention is prepared, the amount of the metal chelate compound as the catalyst is not particularly limited and can be suitably selected in accordance with the exhibited catalytic effect. In general, it is preferable that the amount is 0.001% by mole or more and more preferably 0.005% by mole or more relative to the alkoxysilane. When the amount of the catalyst of the metal chelate compound is less than 0.001% by mole relative to the alkoxysilane, there is the possibility that the catalytic effect on the hydrolysis and the polycondensation is not sufficiently exhibited. The amount of the metal chelate compound used as the catalyst based on the amount of the alkoxysilane has no upper limits and may be suitably selected as long as the metal chelate compound is homogeneously dissolved.

In the process for preparing the solution of a silicone oligomer of the present invention, it is preferable that water and the alkoxysilane are mixed together in amounts such that the ratio of the amounts by mole $H_2O/Si$ is 1.4 to 4.0 and the hydrolysis and the polycondensation are conducted. It is more preferable that water and the alkoxysilane are mixed together in amounts such that the ratio of the amounts by mole $H_2O/Si$ is 1.5 to 2.5 and the hydrolysis and the polycondensation are conducted. When the ratio of the amounts by mole $H_2O/Si$ is smaller than 1.4, there is the possibility that a great amount of the alkoxy group remains unreacted in the preparation of the solution of a silicone oligomer and the molecular weight of the silicone oligomer is not sufficiently increased. This may adversely affect the physical properties of the film of the organopolysiloxane. When the ratio of the amounts by mole $H_2O/Si$ exceeds 4.0, there is the possibility that storage stability of the solution of the silicone oligomer deteriorates.

The solution of a silicone oligomer prepared in accordance with the process of the present invention can be applied to a substrate, forming a coating film of an organopolysiloxane. The solution of the silicone oligomer prepared in accordance with the process of the present invention can also be applied to a substrate having the releasing property and a self-sustained film of an organopolysiloxane can be formed after removing substrate.

To improve the physical properties of the film of the organopolysiloxane of the present invention, oxide sols, in which the dispersion medium is an organic solvent, such as silica sol, antimony oxide sol and alumina sol may be added to the solution of silicone oligomer. Inorganic pigments having excellent weatherability may be dispersed in the solution of silicone oligomer. Examples of the inorganic pigment include oxides such as titanium oxide, iron oxide, alumina, zinc oxide, titanium yellow, cobalt blue and kaolinite. Where necessary, materials having a needle shape such as glass fibers and wiskers and materials in a powder form such as carbon black may also be added.

In the process for preparation of the solution of a silicone oligomer of the present invention, the self-catalyst contains alcohol formed by the hydrolysis which works as the solvent for water and the alkoxysilane. Therefore, the solution remains homogeneous without addition of any hydrophilic organic solvent in the early stage of the reaction and the preparation of the solution of silicone oligomer can be conducted reproducibly. When a great amount of pigments are added to the solution of a silicone oligomer, hydrophilic organic solvents may be added in an amount less than 50 parts by weight per 100 parts by weight of the alkoxysilane used as the raw material in addition to the formed alcohol and the dispersion medium for the oxide sol. When the amount of the hydrophilic organic solvent is 50 parts by weight or more per 100 parts by weight of the alkoxysilane, there is the possibility that the amount of volatile components increases and economic disadvantages arise. It is preferable that the amount of the hydrophilic organic solvent is 20 parts by weight or less per 100 parts by weight of the alkoxysilane used as the raw material. The hydrophilic organic solvent is not particularly limited. Volatile alcohols having a low boiling point such as methanol, ethanol, 1-propanol and 2-propanol are preferably used. In the process for preparation of the solution of a silicone oligomer of the present invention, the hydrophilic organic solvent means an organic solvent which is homogeneously miscible with water in any desired relative amounts at the ordinary temperature.

The process for applying the solution of an silicone oligomer prepared in accordance with the process of the present invention to form a coating film of an organopolysiloxane is not particularly limited. A suitable process can be selected from conventional coating processes in accordance with the shape of the article to be coated and the object of the coating. Examples of the coating process include various processes such as the spraying process, the dipping process, the flow process and the process using rolls. The thickness of the coating film can. be suitably selected in accordance with the object of coating. In general, it is preferable that the thickness is 1 to 50 μm. Inorganic substrates such as metals, glasses, ceramics and concretes and organic substrates such as acrylic resins, ABS resins, woods and papers can be coated with the film of an organopolysiloxane. The coating film protects the surface of the substrate and provides excellent appearance.

The process for forming a self-sustained film of organopolysiloxane from the solution of silicone oligomer prepared in accordance with the process of the present invention is not particularly limited and can be selected from any conventional processes for forming sheets. As the substrate for forming a self-sustained film, substrates of organic materials which do not form bonds with the silanol groups, i.e., organic materials which do not have functional groups such as carbonyl group, imido group and cyano group, and substrates such as glasses, plastics and metals which are coated with the above organic material can be used. Examples of the above organic material include polyethylene, polypropylene, polystyrene, polytetrafluoroethylene, silicones and polyvinyl chloride. To adjust the thickness of the film, an air knife, a bar coater, a doctor blade, a metering roll or a doctor roll can be used.

To increase the curing rate of the film of an organopolysiloxane of the present invention, it is preferable that a curing agent containing a metal chelate compound, an acid, a base or a salt, which is soluble in the hydrophilic organic solvent, is added to and mixed with the solution of a silicone oligomer before the solution is applied to a substrate. Examples of the metal chelate compound include monoisopropoxybis(acetylacetonato)aluminum(III), trisbutoxy(acetylacetonato)titanium(IV), bisbutoxybis(acetylacetonato)titanium(IV) and bisbutoxybis(acetylacetonato)zirconium(IV). Examples of the acid include organic acids such as formic acid, acetic acid, propionic acid, citric acid and malonic acid. Examples of the base include ethylenediamine and monoethanolamine. Example of the salt include ammonium acetate and ammonium formate.

To enhance hardness of the film of an organopolysiloxane of the present invention, the film may be treated by heating at a temperature of the room temperature to 400° C. after the film has been applied and dried. When the temperature of the heat treatment exceeds 400° C., there is the possibility that the film is degraded due to decomposition of the organic groups and the physical properties of the film deteriorate. The film of the organopolysiloxane of the present invention may be treated by heating in the presence of a basic gas such as ammonia, where necessary. By treating the film by heating in the presence of a basic gas, the polycondensation of the unreacted silanol group in the film is promoted by the catalytic effect of the basic gas and the film can be cure at a lower temperature.

EXAMPLES

The present invention will be described more specifically with reference to examples in the following. However, the present invention is not limited to the examples.

Preparation Example 1 (Preparation of a Self-catalyst)

To a mixed solution prepared from 178 parts by weight of methyltriethoxysilane [manufactured by SHIN-ETSU CHEMICAL Co., Ltd., LS-1890] and 45 parts by weight of ethanol, 0.1 part by weight of tris(acetylacetonato)aluminum(III) [manufactured by DOJIN KAGAKU KENKYUSHO, Co., Ltd.] was added. After the mixture was stirred at the room temperature for 30 minutes and tris(acetylacetonato)aluminum(III) was dissolved, 32 parts by weight of distilled water was added to the obtained solution over 1 hour under stirring. The solution was then left standing at the room temperature for 1 day. The obtained solution was used as self-catalyst A.

Preparation Example 2 (Preparation of a Self-catalyst)

To 178 parts by weight of methyltriethoxysilane [manufactured by SHIN-ETSU CHEMICAL Co., Ltd., LS-1890], 23 parts by weight of a 0.01 mole/liter aqueous solution of nitric acid was added. The resultant mixture was stirred for 1 hour and a homogeneous solution was obtained. The solution was then left standing at the room temperature for 1 day. The obtained solution was used as self-catalyst B.

Preparation Example 3 (Preparation of a Self-catalyst)

To 178 parts by weight of methyltriethoxysilane [manufactured by SHIN-ETSU CHEMICAL Co., Ltd., LS-1890], 50 parts by weight of self-catalyst A was added and then 0.03 parts by weight of tris(acetylacetonato)aluminum(III) [manufactured by DOJIN KAGAKU KENKYUSHO, Co., Ltd.] was added to the resultant solution. After the mixture was stirred at the room temperature for 30 minutes and tris(acetylacetonato)aluminum(III) was dissolved, 32 parts by weight of distilled water was added to the obtained solution over 1 hour under stirring. The prepared solution was then left standing at the room temperature for 1 day. The obtained solution was used as self-catalyst C.

Preparation Example 4 (Preparation of a Curing Agent)

To 554 parts by weight of isopropyl alcohol, 246 parts by weight of aluminum tri-sec-butoxide and 200 parts by weight of acetylacetone were added and curing agent A was obtained.

Example 1

To 178 parts by weight of methyltriethoxysilane [manufactured by SHIN-ETSU CHEMICAL Co., Ltd., LS-1890], 50 parts by weight of self-catalyst A was added and then 0.1 part by weight of tris(acetylacetonato)aluminum(III) [manufactured by DOJIN KAGAKU KENKYUSHO, Co., Ltd.] was added to the resultant solution. After the mixture was stirred at the room temperature for 30 minutes and tris(acetylacetonato)aluminum(III) was dissolved, 32 parts by weight of distilled water was added to the obtained solution over 1 hour under stirring. The prepared solution was then left standing at the room temperature for 1 day and the infrared spectrum of the resultant solution was obtained. The absorbance of Si—OC$_2$H$_5$ was 10% or smaller of that in the starting material. This solution of a silicone oligomer had a solid content of about 31% by weight and a viscosity of 8 cP as measured at 25° C. using a B-type viscometer. After this solution was left standing for 1 year at the room temperature, no increase in the viscosity was found and the solution exhibited excellent storage stability.

A glass substrate was dipped into the above solution of a silicone oligomer and coated with the solution of a silicone oligomer. Separately, 0.4 g of ammonium acetate was dissolved into 100 g of the solution of a silicone oligomer and a glass substrate was coated with the obtained solution in accordance with the spraying process. The former sample and the latter sample prepared above were dried at the room temperature for 2 hours and then treated by heating at 120° C. for 30 minutes. The obtained coating films of an organopolysiloxane had thicknesses of about 2 μm and about 10 μm, respectively, and pencil scratch values of 5H and 4H, respectively, as measured in accordance with the method of Japanese Industrial Standard K5400 8.4.2.

Using an evaporator, about 70 g of ethanol was removed from 200 g of the above solution of a silicone oligomer by distillation. To the obtained concentrated solution, 10 g of curing agent A was added and mixed. The obtained mixture was stirred for 10 minutes at the room temperature and a homogeneous solution was obtained. After the obtained solution was left standing at the room temperature for 2 hours, a film was formed from the solution by a doctor blade [manufactured by TSUGAWA SEIKI SEISAKUSHO Co., Ltd., DP-200], dried at 80° C. and peeled off the substrate and a self-sustained film of an organopolysiloxane having a thickness of about 80 μm was obtained.

Example 2

To 178 parts by weight of methyltriethoxysilane [manufactured by SHIN-ETSU CHEMICAL Co., Ltd., LS-1890], 50 parts by weight of self-catalyst C was added and then 0.1 part by weight of tris(acetylacetonato) aluminum(III) [manufactured by DOJIN KAGAKU KENKYUSHO, Co., Ltd.] was added to the resultant solution. After the mixture was stirred at the room temperature for 30 minutes and tris(acetylacetonato)aluminum(III) was dissolved, 32 parts by weight of distilled water was added to the obtained solution over 1 hour under stirring. The prepared solution was left standing at the room temperature for 1 day and the infrared spectrum of the resultant solution was obtained. The absorbance of Si—OC$_2$H$_5$ was 10% or smaller of that in the starting material. This solution of a silicone oligomer had a solid content of about 32% by weight. After this solution was left standing for 1 year at the room temperature, no increase in the viscosity was found and the solution exhibited excellent storage stability.

Into 100 g of the solution of a silicone oligomer, 0.4 g of ammonium acetate was dissolved and a coating solution was obtained. A glass substrate was coated with the obtained solution in accordance with the spraying process. The coated substrate was dried at the room temperature for 2 hours and then treated by heating at 120° C. for 30 minutes. The obtained coating film of an organopolysiloxane had a thicknesses of about 8 $\mu$m and a pencil scratch value of 4H as measured in accordance with the method of Japanese Industrial Standard K5400 8.4.2.

Example 3

To a mixed solution prepared from 126 parts by weight of methyltriethoxysilane [manufactured by SHIN-ETSU CHEMICAL Co., Ltd., LS-1890] and 45 parts by weight of phenyltrimethoxysilane [manufactured by SHIN-ETSU CHEMICAL Co., Ltd., LS-2750], 50 parts by weight of self-catalyst C and 0.1 part by weight of tris (acetylacetonato)aluminum(III) [manufactured by DOJIN KAGAKU KENKYUSHO, Co., Ltd.] were added. After the mixture was stirred at the room temperature for 30 minutes and tris(acetylacetonato)aluminum(III) was dissolved, 33 parts by weight of distilled water was added to the obtained solution over 1 hour under stirring. The prepared solution was stirred at 40° C. for 1 hour and a homogeneous solution of a silicone oligomer was obtained. The obtained solution of a silicone oligomer had a solid content of about 36% by weight and exhibited excellent storage stability for 1 year or longer at the room temperature.

Into 100 g of the solution of a silicone oligomer, 5 g of curing agent A was added and a coating solution was obtained. A glass substrate was coated with the obtained coating solution in accordance with the spraying process and the coated substrate was dried at the room temperature for 2 hours and then treated by heating at 80° C. for 30 minutes. The obtained coating film of an organopolysiloxane had a thicknesses of about 7 $\mu$m and a pencil scratch value of 5H as measured in accordance with the method of Japanese Industrial Standard K5400 8.4.2.

Example 4

To a mixed solution prepared from 130 parts by weight of methyltriethoxysilane [manufactured by SHIN-ETSU CHEMICAL Co., Ltd., LS-1890] and 42 parts by weight of dimethyldiethoxysilane [manufactured by SHIN-ETSU CHEMICAL Co., Ltd., LS-1370], 40 parts by weight of self-catalyst A and 0.03 parts by weight of tris (acetylacetonato)aluminum(III) [manufactured by DOJIN KAGAKU KENKYUSHO, Co., Ltd.] were added. After the mixture was stirred at the room temperature for 30 minutes and tris(acetylacetonato)aluminum(III) was dissolved, 29 parts by weight of distilled water was added to the obtained solution over 1 hour under stirring. The prepared solution was stirred at 40° C. for 1 hour and a homogeneous solution of a silicone oligomer was obtained. The obtained solution of a silicone oligomer had a solid content of about 33% by weight and exhibited excellent storage stability for 1 year or longer at the room temperature.

Into 100 g of the solution of a silicone oligomer, 5 g of curing agent A was added and a coating solution was obtained. A glass substrate, a steel plate and a cement board were coated with the obtained coating solution in accordance with the spraying process and the coated substrates were dried at the room temperature for 2 hours and then treated by heating at 100° C. for 30 minutes. Transparent coating films were obtained on all of the substrates. The pencil scratch value of the coating film on the glass substrate was measured in accordance with the method of Japanese Industrial Standard K5400 8.4.2 and found to be 2H. No coloring by the oxidation reaction at the interface was observed on the coating film on the steel plate.

Example 5

To a mixed solution prepared from 136 parts by weight of methyltrimethoxysilane [manufactured by SHIN-ETSU CHEMICAL Co., Ltd., LS-530] and 30 parts by weight of self-catalyst A, 0.03 parts by weight of tris(acetylacetonato) aluminum(III) [manufactured by DOJIN KAGAKU KENKYUSHO, Co., Ltd.] was added. After the mixture was stirred at the room temperature for 30 minutes and tris (acetylacetonato)aluminum(III) was dissolved, 32 parts by weight of distilled water was added to the obtained solution over 1 hour under stirring. The prepared solution was left standing at the room temperature for 1 day and the infrared spectrum of the resultant solution was obtained. The absorbance of Si—OCH$_3$ was 10% or smaller of that in the starting material. This solution of a silicone oligomer had a solid content of about 38% by weight. When the solution was left standing at the room temperature, gelation did not take place in three months and the solution exhibited excellent storage stability.

Into 100 g of the solution of a silicone oligomer, 0.4 g of ammonium acetate was dissolved and a coating solution was obtained. A glass substrate was coated with the obtained coating solution in accordance with the spraying process and the coated substrate was dried at the room temperature for 2 hours and then treated by heating at 120° C. for 30 minutes. The obtained coating film of an organopolysiloxane had a thicknesses of about 10 $\mu$m and a pencil scratch value of 4H as measured in accordance with the method of Japanese Industrial Standard K5400 8.4.2.

Example 6

To a mixed solution prepared from 178 parts by weight of methyltriethoxysilane [manufactured by SHIN-ETSU CHEMICAL Co., Ltd., LS-1890] and 50 parts by weight of self-catalyst B, 0.3 parts by weight of tris(acetylacetonato) aluminum(III) [manufactured by DOJIN KAGAKU KENKYUSHO, Co., Ltd.] was added. After the mixture was stirred at the room temperature for 30 minutes and tris (acetylacetonato)aluminum(III) was dissolved, 34 parts by weight of distilled water was added to the obtained solution over 1 hour under stirring. The prepared solution was left standing at the room temperature for 1 day and the infrared spectrum of the resultant solution was obtained. The absorbance of Si—OC$_2$H$_5$ was 10% or smaller of that in the starting material. This solution of a silicone oligomer had a solid content of about 32% by weight. When the solution was left standing at the room temperature, gelation did not take place in three months and the solution exhibited excellent storage stability.

Into 100 g of the solution of a silicone oligomer, 0.4 g of ammonium acetate was dissolved and a coating solution was obtained. A glass substrate was coated with the obtained coating solution in accordance with the spraying process and the coated substrate was dried at the room temperature for 2 hours and then treated by heating at 120° C. for 30 minutes. The obtained coating film of an organopolysiloxane had a thicknesses of about 12 μm and a pencil scratch value of 4H as measured in accordance with the method of Japanese Industrial Standard K5400 8.4.2.

Example 7

The solution of a silicone oligomer obtained in Example 1 in an amount of 100 parts by weight and 33 parts by weight of an organosilica sol containing isopropyl alcohol as the dispersion medium [manufactured by NISSAN CHEMICAL INDUSTRIES, Ltd., IPA-ST, the solid content: 30% by weight] were mixed together. After the mixture was left standing at the room temperature for 1 day, 5 parts by weight of curing agent A was added and a coating fluid was obtained. A glass substrate was coated with the obtained coating fluid in accordance with the spraying process and the coated substrate was dried at the room temperature for 2 hours and then treated by heating at 80° C. for 30 minutes. The obtained coating film of an organopolysiloxane had a thicknesses of about 7 μm and a pencil scratch value of 5H as measured in accordance with the method of Japanese Industrial Standard K5400 8.4.2.

Example 8

To a mixed solution prepared from 178 parts by weight of methyltriethoxysilane [manufactured by SHIN-ETSU CHEMICAL Co., Ltd., LS-1890] and 10 parts by weight of self-catalyst C, 0.05 parts by weight of tris(acetylacetonato) aluminum(III) [manufactured by DOJIN KAGAKU KENKYUSHO, Co., Ltd.] was added. After the mixture was stirred at the room temperature for 30 minutes and tris (acetylacetonato)aluminum(III) was dissolved, 32 parts by weight of distilled water was added to the obtained solution over 2 hours under stirring. The obtained solution of a silicone oligomer had a solid content of about 32% by weight. After this solution was left standing for 1 year at the room temperature, no increase in the viscosity was found and the solution exhibited excellent storage stability.

Into 100 g of the solution of a silicone oligomer, 5 g of curing agent A was added and a coating solution was obtained. A glass substrate was coated with the obtained coating solution in accordance with the spraying process and the coated substrate was dried at the room temperature for 2 hours and then treated by heating at 80° C. for 30 minutes. The obtained coating film of an organopolysiloxane had a thicknesses of about 5 μm and a pencil scratch value of 5H as measured in accordance with the method of Japanese Industrial Standard K5400 8.4.2.

Comparative Example 1

To 178 parts by weight of methyltriethoxysilane [manufactured by SHIN-ETSU CHEMICAL Co., Ltd., LS-1890], 32 parts by weight of a 0.1 mole/liter aqueous solution of nitric acid was added. The obtained mixture was stirred for 20 minutes and a transparent solution was obtained. When the solution was left standing at the room temperature for 3 hours, precipitates of the octamer were formed and a stable solution of a silicone oligomer was not obtained.

A steel plate was coated with the supernatant solution in accordance In with the spraying process. After about 5 hours at the room temperature, the coating film of the organopolysiloxane was colored in brown. The oxidation reaction was considered to have taken place at the interface.

Comparative Example 2

To 178 parts by weight of methyltriethoxysilane [manufactured by SHIN-ETSU CHEMICAL Co., Ltd., LS-1890], 32 parts by weight of distilled water was added. When the obtained mixed fluid was continuously stirred at the room temperature for 5 hours, the mixed fluid turned turbid in white while the fluid was held separated in two phases. It was found to be difficult that a homogeneous solution was obtained at the room temperature in a short period of time.

INDUSTRIAL APPLICABILITY

In accordance with the process of the present invention, a solution of a silicone oligomer which exhibits excellent storage stability in high concentrations and contains small or no amounts of acid or base components can be produced by hydrolyzing and polycondensing an alkoxysilane in the presence of a self-catalyst. A film of an organopolysiloxane having excellent physical properties can be formed from the above solution of a silicone oligomer.

What is claimed is:

1. A process for producing a solution of a silicone oligomer which comprises:

adding to an alkoxysilane, as a self-catalyst, a solution comprising a silicon compound which is soluble in hydrophilic organic solvents and has an average structural unit represented by $R^1_n SiO_{x/2}(OH)_y(OR^2)_z$, wherein $R^1$ represents an alkyl group having 1 to 3 carbon atoms, vinyl group or phenyl group, a plurality of $R^1$ may represent a same group or different groups, $R^2$ represents an alkyl group having 1 to 3 carbon atoms, a plurality of $R^2$ may represent a same group or different groups and n, x, y and z represent numbers satisfying relations: $0<n<3, 0<x<4, y>0, z\geq 0$ and $y+z=4-n-x$;

and hydrolyzing and polycondensing the alkoxysilane.

2. A process for producing a solution of a silicone oligomer according to claim 1, wherein a metal chelate compound is added as a catalyst.

3. A process for producing a solution of a silicone oligomer according to claim 1, wherein the silicone oligomer comprised in the solution of a silicone oligomer has an average structural unit represented by $R^3_a SiO_{b/2}(OH)_c(OR^4)_d$, wherein $R^3$ represents an alkyl group having 1 to 3 carbon atoms, vinyl group or phenyl group, a plurality of $R^3$ may represent a same group or different groups, $R^4$ represents an alkyl group having 1 to 3 carbon atoms, a plurality of $R^4$ may represent a same group or different groups and a, b, c and d represent numbers satisfying relations: $0.8\leq a\leq 1.7, 2<b<3.2, c>0, d>0$ and $c+d=4-a-b$.

4. A process for producing a solution of a silicone oligomer according to claim 1, wherein the self-catalyst is prepared by hydrolyzing and polycondensing an alkoxysilane in a presence of at least one compound selected from the group consisting of acids and metal chelate compounds as a catalyst.

5. A process for producing a solution of a silicone oligomer according to claim 1, wherein the self-catalyst is prepared by hydrolyzing and polycondensing an alkoxysilane in a presence of, as a catalyst, a solution comprising a silicon compound which is soluble in hydrophilic solvents and has an average structural unit represented by $R^1{}_n SiO_{x/2}(OH)_y(OR^2)_z$, wherein $R^1$ represents an alkyl group having 1 to 3 carbon atoms, vinyl group or phenyl group, a plurality of $R^1$ may represent a same group or different groups, $R^2$ represents an alkyl group having 1 to 3 carbon atoms, a plurality of $R^2$ may represent a same group or different groups and n, x, y and z represent numbers satisfying relations: $0 \leq n < 3$, $0 < x < 4$, $y > 0$, $z \geq 0$ and $y+z=4-n-x$.

6. A process for producing a solution of a silicone oligomer according to claim 5, wherein a metal chelate compound is added as a catalyst.

7. A process for producing a solution of a silicone oligomer according to claim 2, wherein a ligand of the metal chelate compound is at least one compound selected from the group consisting of β-diketones and cyclic polyethers having a large ring.

8. A process for producing a solution of a silicone oligomer according to claim 4, wherein a ligand of the metal chelate compound is at least one compound selected from the group consisting of β-diketones and cyclic polyethers having a large ring.

9. A process for producing a solution of a silicone oligomer according to claim 6, wherein a ligand of the metal chelate compound is at least one compound selected from the group consisting of β-diketones and cyclic polyethers having a large ring.

10. A film of an organopolysiloxane formed from a solution of a silicone oligomer which is produced in accordance with a process described in claim 1.

11. A process for producing a solution of a silicone oligomer according to claim 1, wherein $0.8 \leq n < 3$.

12. A process for producing a solution of a silicone oligomer according to claim 1, wherein $0.8 \leq n \leq 2$.

13. A film according to claim 10, wherein said film is self-sustaining.

* * * * *